March 18, 1947.   N. H. BREWER   2,417,466
MANUFACTURE OF PNEUMATIC TIRE TREADS
Filed July 12, 1944
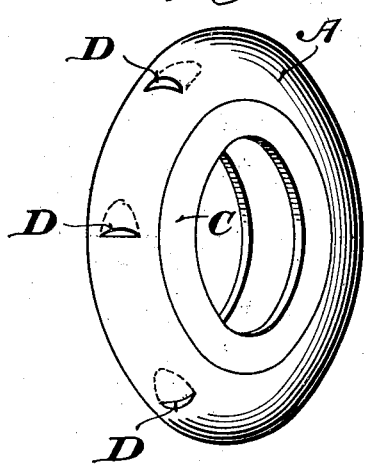
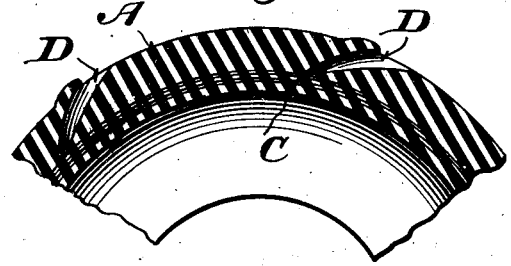
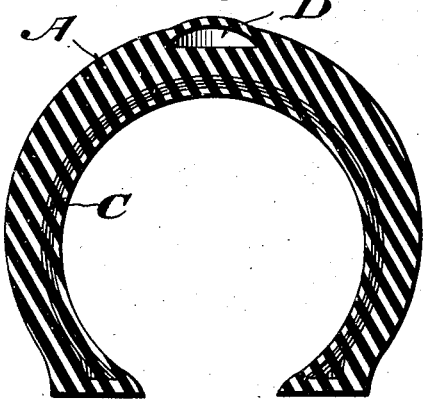
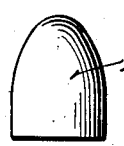
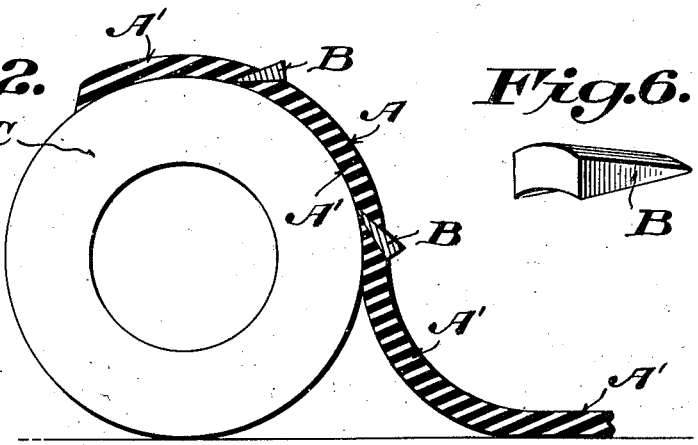
Inventor
Nannie H. Brewer
By
Attorneys Patented Mar. 18, 1947

2,417,466

UNITED STATES PATENT OFFICE 2,417,466

MANUFACTURE OF PNEUMATIC TIRE TREADS

Nannie H. Brewer, Rockville, Md.

Application July 12, 1944, Serial No. 544,576

1 Claim. (Cl. 154—14)

The invention relates to the manufacture of pneumatic tire treads particularly adapted for use on airplanes, and the principal object thereof is to provide an airplane tire which will promote safety by saving the tires from shocks and blow-outs during landing or grounding of the airplane, said tires and their wheels being rotated by air currents impinging upon and trapped in pockets formed or provided in the tread of the tires.

I will explain the invention with reference to the accompanying drawing which discloses one practical embodiment thereof to enable others familiar with the art to adopt and use the same, and will summarize in the claim the essential features of the invention for which protection is desired.

In said drawing:

Fig. 1 is a perspective view of a tire, according to my invention.

Fig. 2 is a side view partly in section showing the tire during one step in its manufacture.

Fig. 3 is an enlarged longitudinal section through a portion of the tire showing several said pockets.

Fig. 4 is an enlarged transverse view through the tire at one of the pockets.

Fig. 5 is a top plan view of a spike, detached.

Fig. 6 is a perspective view of the spike shown in Fig. 5.

Fig. 7 is an end view of the spike shown in Fig. 5.

According to my invention, before the tire is cured, the tread stock A is cut into or slit into a number of equal sections A (Fig. 2), on a bias, and metal spikes B (Figs. 5-6-7) are inserted between adjacent ends of the stock as shown in Fig. 2 extending from the fabric or other carcass C to the outside of the tread A as the tread stock is put on the carcass. After curing, the spikes B are removed, leaving the tread with a number of spaced holes or pockets D therein as shown in Figs. 1, 3 and 4, each pocket being about one-thirty-second of an inch to two inches deep, about six inches wide at the outside of the tread A, the axes of the pockets being disposed at a five to fifty degree angle to the outer surface of the tread A. These metal spikes B are about four inches long and correspond with but are less than the width of the tread A, as shown in Figs. 1 and 4. The mouths of the pockets lie in the curve of the inflated tread A on the outside of the tire.

At one end each spike B is about six inches wide to correspond with but less than the width of the outside of the tread A, and the other carcass end is of less width, about three inches wide, corresponding with but less than the carcass width. If the tread is seven inches wide a six inch spike should be used. The spike should correspond substantially with the tread thickness, same being on a bias, increasing from about one-thirty-second of an inch at the carcass end to about two inches at the outer face of the tread A.

The tire is mounted on the wheel, so that the holes D or pockets above the horizontal medial plane of the tire face in a direction opposite from that in which the airplane is moving. Air streams will impinge in the holes in the tread causing the wheel to rotate. This will continue as long as the airplane is in the air and hence the wheels of the airplane will be rotating when the wheels contact the ground.

I claim:

In the manufacture of pneumatic tires for airplanes and the like, the step of forming a plurality of uncured sections of outer tread stock having their ends cut on a bias, placing the sections on a tire carcass before curing of the tire; interposing metallic spikes between the adjacent ends of the stock sections, said spikes being shaped to form pockets in the outer tread opening at the surface of the outer tread and extending inwardly to the carcass, said pockets being all inclined in the same direction at a slight angle with respect to the adjacent outer surface of the tire; curing the said tire; and removing the said spikes.

NAN H. BREWER.

REFERENCES CITED

The following references are of record in the file of this patent:

UNITED STATES PATENTS

| Number | Name | Date |
|---|---|---|
| 2,333,447 | Schippel | Nov. 2, 1943 |
| 1,834,427 | Schumacher | Dec. 1, 1931 |